IP8212 XR 4,058,834

United States Patent [19]

Miyaoka

[11] 4,058,834

[45] Nov. 15, 1977

[54] SYSTEM FOR MAKING A LIGHT BEAM SCAN A FLAT CARRIER WITH AUTOFOCUSING

[75] Inventor: Senri Miyaoka, Zushi, Japan

[73] Assignee: Sony Corporation, Tokyo, Japan

[21] Appl. No.: 658,999

[22] Filed: Feb. 18, 1976

[30] Foreign Application Priority Data

Feb. 24, 1975 Japan .................................. 50-22590

[51] Int. Cl.² .............................................. H04N 5/76

[52] U.S. Cl. ............................ 358/128; 179/100.3 V; 250/201

[58] Field of Search ................ 179/100.3 V; 358/128, 358/130, 227; 250/200, 201, 202, 203, 570; 350/255; 352/26, 103; 340/173 LM

[56] References Cited

U.S. PATENT DOCUMENTS

| | | | |
|---|---|---|---|
| 3,932,701 | 1/1976 | Adler | 179/100.3 V |
| 3,944,727 | 3/1976 | Elliott | 179/100.3 V |
| 3,959,581 | 5/1976 | Laub | 179/100.3 V |

*Primary Examiner*—Bernard Konick
*Assistant Examiner*—Alan Faber
*Attorney, Agent, or Firm*—Lewis H. Eslinger; Alvin Sinderbrand

[57] ABSTRACT

A light beam scanning system having an automatic focus correction, comprises a flat carrier having first and second oppositely facing reflective surfaces at least one of which has variations defining a recorded signal, first and second lens assemblies positioned against the first and second reflective surfaces, respectively, an optical assembly providing a light beam path between the first and second lens assemblies and a light source. A light beam emitted from the light source is guided to the first reflective surface of the carrier through the first lens assembly and reflected from such first surface and passed through the first lens assembly, along the optical path between the first and second lens assemblies and through the second lens assembly. The first and second lens assemblies are arranged so that their respective image magnifications or magnification factors satisfy a specific interrelation, thereby to establish the autofocusing of the light beam at the second reflective surface. The light beam directed toward the first reflective surface is focused by said first lens assembly at a point which is spaced along said path from said first surface in the direction toward said first lens assembly.

6 Claims, 4 Drawing Figures

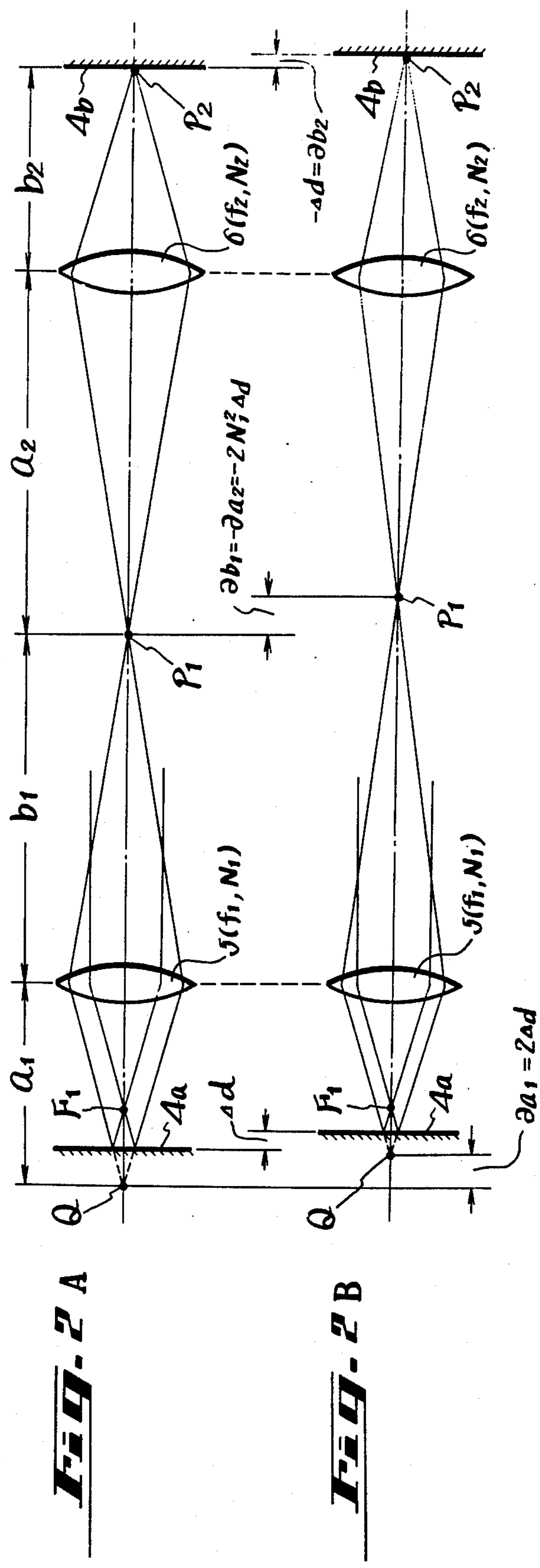
Fig. 2A
Fig. 2B
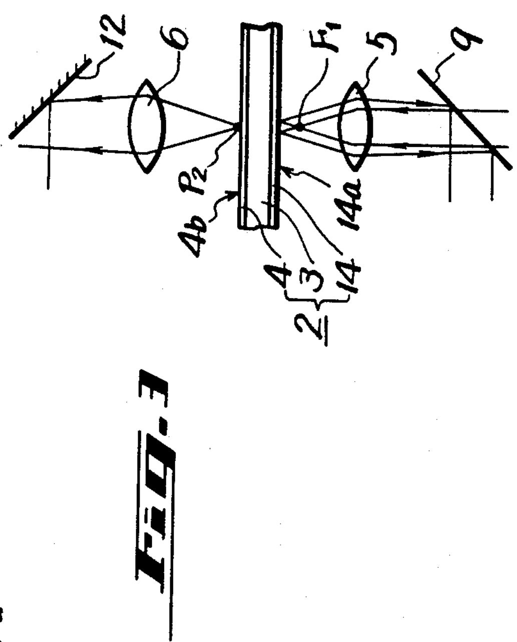
Fig. 3

SYSTEM FOR MAKING A LIGHT BEAM SCAN A FLAT CARRIER WITH AUTOFOCUSING

BACKGROUND OF THE INVENTION

1. Field of the Invention

This invention relates generally to a signal play-back device in which a light beam scans a flat carrier for reading signals recorded thereon, and more particularly to an optical system for such a device by which the scanning light beam keeps a predetermined focus condition on the carrier in spite of the deviation of the carrier from a predetermined position.

2. Description of the Prior Art

It has been proposed to optically record signals, for example, a video signal, on a flat record carrier and/or to optically read signals recorded on the flat record carrier by means of a light beam scanning the surface of the flat record carrier.

In an optical system for such an optical recording and/or reading device, it is required for recording or reading the signals accurately that the light beam which scans the record carrier be always in the proper focus condition, for example, the condition of exact focus on the surface of the record carrier without being influenced by deviations of the carrier from a predetermined position.

However, in the case where a rotatable disc is employed as the flat record carrier and its surface is used for recording signals as usual, if the surface of the rotating disc is inclined in relation to an axis for rotation or if the surface of the rotating disc moves in the direction of the axis of rotation under the influence of the rotation of the disc, which inclination or movement is usually caused to a certain degree in all practical systems, the distance between the surface of the disc and a lens provided for focussing the scanning light beam on the surface of the disc would undesirably vary and, as a result, the scanning light beam would not always keep the proper focus condition on the surface of the disc and the deterioration of the light beam focus would result.

To compensate for the above mentioned deterioration in the focus condition of the scanning light beam, it has been proposed in prior art systems to detect the instantaneous, position of the surface of the rotating disc and, in response to the detected information, to move the lens or the rotating disc to maintain a predetermined distance between the surface of the disc and the lens so as to always keep the scanning light beam in the proper focus condition on the surface of the rotating disc. However, this proposal requires a very complicated and expensive servomechanism, and besides it is difficult for the servomechanism to accurately follow quick variations in the distance because the lens or the disc has a relatively large mass and, therefore, cannot be moved so quickly and accurately. Therefore, the desired compensation is not adequately achieved.

There has been another previous proposal to avoid the deteriorations in the focus condition of the scanning light beam. It is to install the rotatable disc so that its surface is perfectly perpendicular to the axis of rotation and further to absolutely prevent movement of the surface of the rotating disc in the direction of the axis of rotation. This proposal, however, is impossible to realize in any practical system.

Accordingly, the prior art systems have not accomplished sufficient compensation or avoidance of deterioration in the focus condition of the light beam scanning the rotating disc.

SUMMARY OF THE INVENTION

It is an object of the present invention to eliminate the above described disadvantages inherent in the prior art systems and provide a light beam scanning system in which the proper focus of a light beam on a scanned plane can be maintained without using a focus-servomechanism.

Another object of the present invention is to provide a light beam scanning system which can maintain a predetermined focus of a light beam on a carrier scanned by the light beam, in spite of deviations in the position of the carrier, without moving any optical device disposed in the path of the light beam or the carrier.

Still, another object of the present invention is to provide an improved optical signal reading a play-back device which is used for reading a video signal recorded on a rotatable disc by means of a light beam.

In the optical system according to the present invention, a flat carrier having first and second reflective surfaces substantially parallel and opposed to each other is provided and at least the second surface has variations defining a recorded signal. A light beam is first guided to the first surface of the carrier through a first focussing lens. Then, the reflected light beam is guided from the first surface to the second surface of the carrier on which a signal is recorded by way of the first focussing lens again, the optical system further comprising some mirrors for changing the direction of a light beam path and a second focussing lens. Both first and second focussing lenses are fixed at predetermined relative positions so that their respective image magnifications or magnification factors satisfy a specific interrelation. With this particular arrangement of the first and second focussing lenses, the automatic focus correction of the light beam is established.

The above, and other objects, features and advantages of the present invention, will be apparent from the following description taken in conjunction with the accompanying drawings.

BRIEF DESCRIPTION OF THE DRAWINGS

FIGS. 2A and 2B are schematic diagrams used for explaining the autofocussing obtained in the light beam scanning system of the invention shown in FIG. 1, and FIG. 3, is a schematic diagram showing a part of another embodiment of a light beam scanning system according to the present invention.

DESCRIPTION OF THE PREFERRED EMBODIMENTS

Figure 1:
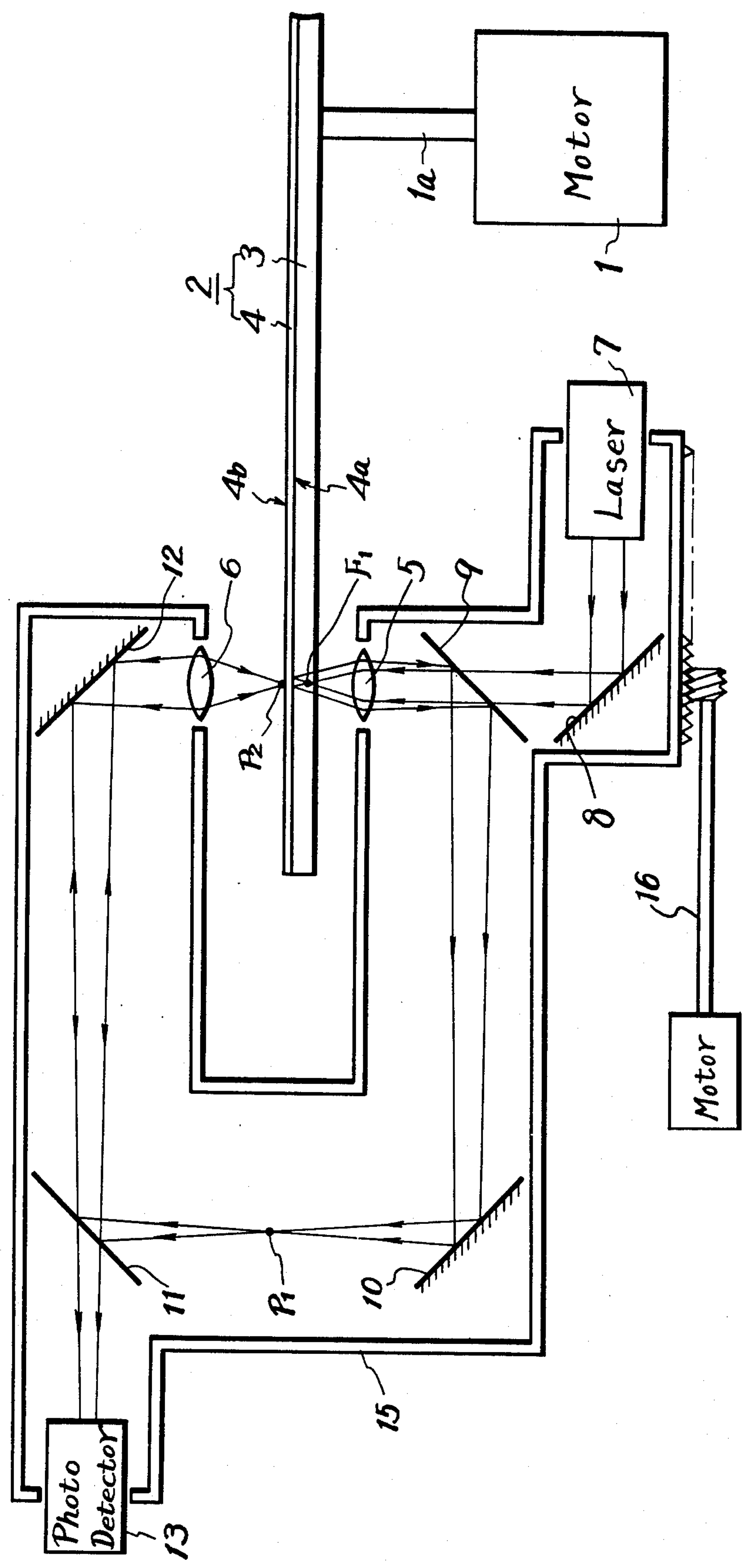
FIG. 1 is a schematic diagram showing one embodiment of a light beam scanning system according to the present invention.

An embodiment of the light beam scanning systems according to the present invention will now be described with reference to FIGS. 1, 2A and 2B.

FIG. 1 shows schematically an example in which the light beam scanning system of the invention is employed to reproduce or play-back a signal such as a video signal. In FIG. 1, reference numeral 1 designates a motor whose rotary shaft 1*a* is coupled with a rotary recorded flat carrier 2. The recorded flat carrier 2 consists of a transparent disc 3 made of, for example, resin or the like, whose front surface constitutes a recorded face on which a video signal is recorded in the form of plural grooves, and of a reflective layer 4 made of metal which is coated on the recorded face of the disc 3.

In this example, a first lens assembly 5 is located in opposed relation to a face 4a of the reflective layer 4 which is in close contact with the transparent carrier disc 3 and which constitutes a first reflective surface and a second lens assembly 6 is located in opposed relation to a face 4b of the reflective layer 4 which faces away from the face 4a and constitutes a second reflective surface. As the first and second lens assemblies 5 and 6, an objective lens assembly whose focal depth is rather short is employed. By way of example, a parallel laser light beam emitted from a light source such as a laser 7 is reflected on a mirror 8 and then directed through a half mirror 9, the first lens assembly 5 and the transparent disc 3 to be incident on the first reflective surface, that is, face 4a of the reflective layer 4. Since the laser light beam incident on the face 4a is reflected thereon, the reflected laser light beam is again incident on the half mirror 9 through the first lens assembly 5, then reflected on a mirror 10 and a half mirror 11 and a mirror 12 sequentially and thereafter incident on the opposite face 4b of the reflective layer 4, that is, the second reflective surface, through the second lens assembly 6. The laser light beam reflected on the face 4b is again directed to the mirror 12 through the second lens assembly 6 to be reflected on the mirror 12, and the laser light beam reflected on the mirror 12 is introduced through the half mirror 11 to a photo-detector 13. It will be apparent that the laser light beam incident on the face 4b will scan the face 4b as the recorded flat carrier 2 is rotated.

When the light incident on the first lens assembly 5 is a parallel light beam as in the case of FIG. 1, even if the recorded flat carrier 2 is moved or vibrated up and down between the first and second lens assemblies 5 and 6 and hence the position of the face 4a of the reflective layer 4 is varied or deviated from a predetermined position, the first lens assembly 5 is positioned so that the light beam incident on the face 4a through the first lens assembly 5 is always focussed at a point (focus) $F_1$ before the face 4a, that is, spaced from the latter in the direction toward lens assembly 5, and also the light beam reflected on the face 4a and passed through the lens assembly 5 and the mirrors 9, 10 is focussed at an image point $P_1$ between the mirror 10 and the half mirror 11.

The length of the light path from the face 4a through the first lens assembly 5, the mirrors 9, 10, 11 and 12 and the second lens assembly 6 in this order to the face 4b is so selected that it is maintained always constant even if the recorded carrier 2 is moved up and down between the first and second lens assemblies 5 and 6 and accordingly the position of the faces 4a and 4b is varied or deviated from a predetermined position. To this end, when the second lens assembly 6 is moved in the radial direction of the rotating carrier 2 for making the light beam incident on the face 4b scan the face 4b in a spiral trace, all the parts from the laser 7 to the photo-detector 13, for example, are accommodated in a common housing 15 (which can be moved by a moving device 16) and the first lens assembly 5 and mirrors 8 to 12 are moved together with the second lens assembly 6.

Further, the above light path from face 4a to face 4b is selected in length such that when the carrier 2 is stopped and the distances between the faces 4a, 4b and the lens assemblies 5, 6 are of predetermined values, the light beam incident on the face 4b through the second lens assembly 6 is focussed on the face 4b at an image point $P_2$, that is, is just focussed on the face 4b. (As a result of the above,) the light beam can automatically always maintain its just focussed condition on the face 4b by setting the below mentioned selected interrelation between the first and second lens assemblies 5 and 6 even though the carrier 2 is moved up and down therebetween the faces 4a and 4b are deviated from their predetermined positions. That is, in this case if it is assumed that the image magnification or magnification factor of the first lens assembly 5 is taken as $N_1$ and that of the second lens assembly 6 as $N_2$, the interrelation between the lens assemblies 5 and 6 are selected to satisfy the equation $N_1 \cdot N_2 = 1/\sqrt{2}$.

FIGS. 2A and 2B are schematic diagrams used for explaining that if the interrlation between the lens assemblies 5 and 6 is selected as above, the light beam can automatically always maintain its just focussed condition on the face 4b.

FIG. 2A shows the case in which the faces 4a and 4b are at rest in predetermined positions and the light beam is focussed on the face 4b at the image point $P_2$, that is, just focussed. In this case, the light beam passed through the lens assembly 5 is focussed at the focus point $F_1$ or in fromt of before the face 4a, then incident on face 4a and reflected thereon, so that the light beam reflected on the face 4a could be considered as a light beam which is emitted from a point Q which is in back of face 4a, that is, synnetrical to the focus $F_1$ with respect to the face 4a. The reflected light beam on the face 4a again passes through the lens assembly 5, is focussed at the image point $P_1$, then incident on the lens assembly 6 and thereafter focussed at the image point $P_2$ on the face 4b.

If it is assumed that the length of the light path from the lens assembly 5 to the point Q is $a_1$; the length of the light path from the lens assembly 5 to the image point $P_1$ is $b_1$; the length of the light path from the lens assembly 6 to the image point $P_1$ is $a_2$; the length of the light path from the lens assembly 6 to the image point $P_2$ is $b_2$; and the focal lengths of the lens assemblies 5 and 6 are $f_1$, $f_2$ respectively, the following equations (1) and (2) can be established.

$$1/a_1 + 1/b_1 = 1/f_1 \quad (1)$$

$$1/a_2 + 1/b_2 = 1/f_2 \quad (2)$$

Since the image magnifications or magnification factors $N_1$ and $N_2$ of the lens assemblies 5 and 6 are expressed as follows, $$N_1 = b_1/a_1 \quad (3)$$

$$N_2 = b_2/a_2 \quad (4)$$

the following equations (5) and (6) are obtained based upon the above equations (1) to (4).

$$f_1 = N_1/(N_1 + 1)\, a_1 \quad (5)$$

$$f_2 = \frac{N_2}{N_2 + 1} a_2 \quad (6)$$

By differentiating the following equations (7) and (8), which are re-written forms of the equations (1) and (2), $$b_1 = f_1 \frac{a_1}{a_1 - f_1} \quad (7)$$

-continued $$b_2 = f_2 \frac{a_2}{a_2 - f_2} \quad (8)$$

with respect to $a_1$ and $a_2$, respectively, the following equations (9) and (10) are obtained.

$$\frac{\delta b_1}{\delta a_1} = f_1 \left( \frac{1}{a_1 - f_1} - \frac{a_1}{(a_1 - f_1)^2} \right) = - \frac{f_1^2}{(a_1 - f_1)^2} \quad (9)$$

$$\frac{\delta b_2}{\delta a_2} = f_2 \left( \frac{1}{a_2 - f_2} - \frac{a_2}{(a_2 - f_2)^2} \right) = - \frac{f_2^2}{(a_2 - f_2)^2} \quad (10)$$

By substituting the equations (9) and (10) for the equations (5) and (6), respectively the following equations (11) and (12) are obtained.

$$\frac{\delta b_1}{\delta a_1} = - N_1^2 \quad (11)$$

$$\frac{\delta b_2}{\delta a_2} = - N_2^2 \quad (12)$$

In this case, since the image magnifications $N_1$ and $N_2$ of the lens assemblies 5 and 6 are selected in accordance with this invention to satisfy the following equation (13), $$N_1 \cdot N_2 = \frac{1}{\sqrt{2}} \quad (13)$$

if the equation (13) is substituted into the equation (12), the following equation (14) is obtained.

$$\frac{\delta b_2}{\delta a_2} = - \frac{1}{2N_1^2} \quad (14)$$

Accordingly, in the event that the recorded carrier 2 is vibrated up and down between the first and second lens assemblies 5 and 6, and hence the position of the faces 4*a* and 4*b* of the reflective layer 4 are deviated from their predetermined positions by an amount or extent which within a relatively small range, the deviation amounts $\delta a_1$, $\delta b_1$ of the lengths $a_1$, $b_1$ of the lens assembly 5 will satisfy the equation (11), while those $\delta a_2$, $\delta b_2$ of the lengths $a_2$, $b_2$ of the lens assembly 6 will satisfy the equation (14).

In this case, if the position of the face 4*a* relative to the lens assembly 5 is varied by $\Delta d$ as shown in FIG. 2B, the positin of the face 4*b* relative to the lens assembly 6 is varied by $-\Delta d$ as. The positive and negative signs are used in connection with the variation $\Delta d$ since, when the face 4*a* moves close to the lens assembly 5, the face 4*b* moves apart from the lens assembly 6, while when the face 4*a* moves apart from the lens assembly 5, the face 4*b* becomes close to the lens assembly 6. FIG. 2B represents the former case and hence the deviation of the face 4*a* relative to the lens assembly 5 is indicated by a positive sign but that of the face 4*b* relative to the lens assembly 6 is indicated by a negative sign. When the position of the face 4*a* relative to the lens assembly 5 is varied by $\Delta d$, the point Q is varied by $2\Delta d$ from its former position, namely the varying amount $\delta a_1$ of the length $b_1$ becomes $-2N_1^2 \Delta d$. Since the length of the light path between both the lens assemblies 5 and 6 is constant, the varying amount $\delta a_2$ of $a_2$ is the same in magnitude as the varying amount $\delta b_1$ of $b_1$ but opposite in sign and hence $\delta a_2 = -\delta b_1 = 2N_1^2 \Delta d$. If this equation is substituted in equation (14), the varying amount $\delta b_2$ of $b_2$ becomes $\Delta d$ which is the same as the varying amount of the face 4*b* relative to the lens assembly 6.

As may be apparent from the above description, if the above conditions are satisfied, the distance between the lens assembly 6 and the face 4*b* always coincides with the distance between the lens assembly 6 and the image point $P_2$ where the light beam passed through the lens assembly 6 is focussed as an image to always provide the just focussed condition of the light beam on the face 4*b* regardless of any variation in the position of the face 4*b* relative to the lens assembly 6.

In the example of the invention shown in FIG. 1, it will be apparent that the light beam incident on the face 4*a* through the transparent disc 3 and the light beam reflected from the face 4*a* and passed through the transparent disc 3 are refracted at the under surface of the disc 3 due to the fact that the refractive index of the disc 3 differs from that of the environment thereof. However, if the refractive index of the disc 3 is similar or approximately equal to that of its environment, even if the above mentioned condition is selected without considering the refraction of the light beam at the under surface of the disc 3, no serious problem may occur.

FIG. 3 shows a main part of another embodiment of the present invention.

In the example of the invention shown in FIG. 3, the record carrier is provided with another reflective layer 14 on the face opposite to the recorded face of the disc 3 covered by the layer 4. In this case, since the light beam passed through the lens assembly 5 is first reflected on a surface 14*a* of the reflective layer 14, it is sufficient that the length of the light path is selected similarly as in the case of FIG. 1 with the consideration that the surface 14*a* corresponds to the face 4*a* of the reflective layer 4 as shown in FIG. 1 on which the light beam is reflected. An advantage of the record carrier of FIG. 3 is that the disc thereof may be formed of a material which is not transparent.

In the event that the light beam incident on the lens assembly 5 through the half mirror 9 from source 7 is diverged from one point rather than being parallel, as in FIG. 1, the illustrated so-called overfocus in which the light beam is focussed by lens assembly 5 before the face 4*a* or 14*a* is replaced by a so-called underfocus in which the light beam is focussed behind the face 4*a* or 14*a*.

With the light bean scanning system of the present invention, as described above, a desired just focussed condition of the light beam can be always maintained on the recorded face by suitably arranging the lens assembly only, even if the position of the recorded face relative to the lens assembly is varied, without using complicated devices, such as, a servomechanism.

The light beam scanning system of the invention can be used for the signal recording in which a desired focussed condition of the light beam is to be always obtained on the recorded surface of a carrier when signals are recorded in the form of plural grooves on the recorded surface of the carrier. Accordingly, this invention is suitable for use with such a device to optically record on a rotatable disc a video signal which is relatively wide in frequency band and therefore requires accurate recording and reproducing devices therefor or to optically read out a recorded video signal on a rotatable disc.

Although specific embodiments of the invention have been described in detail herein with reference to the accompanying drawings, it will be apparent that many modifications and variations could be effected therein by one skilled in the art without departing from the spirit or scope of the invention as defined by the appended claims.

I claim as my invention:

1. In a signal play-back device having a substantially flat record carrier with first and second oppositely facing reflective surfaces and a signal recorded as variations in at least said second surface, a light source emitting a light beam for scanning the recorded signal variations and providing correspondingly varied reflected beam energy, and photo-detecting means for receiving said varied reflected beam energy and providing a corresponding output; an optical system for continuously focussing said light beam at a point on said second surface irrespective of movements of said record carrier in directions normal to said surfaces comprising first lens means directing said light bean from said source in a path extending substantially normal to said first surface for reflection by the latter and focussing the light beam reflected from said first surface at an image point remote from said first surface, second lens means focussing said image point onto said second surface and directing the reflection of said image point from said second surface to said photodetecting means, said light beam, as received by said first lens means from said light source, being a parallel light beam, said first lens means being dimensioned and positioned in respect to said record carrier and said light source for focussing said parallel light beam from the latter at a point which is spaced along said path from said first surface in the direction toward said first lens means for the full range of said movements of the record carrier in sid directions, and said first and second lens means having respective magnification factors $N_1$ and $N_2$ satisfying the following relation:

$$N_1 \cdot N_2 = 1/\sqrt{2}.$$

2. A signal play-back device according to claim 1; in which said record carrier includes a substantially flat transparent base member and a reflective metal layer on one of the faces of said base member for defining said first and second reflective surfaces at the sides of said reflective metal layer which face toward and away from, respectively, said base member.

3. A signal play-back device according to claim 1; in which said record carrier includes a substantially flat base member and reflective metal layers on the opposite faces of said base member for defining said first and second reflective surfaces.

4. A signal play-back device according to claim 1; in which said optical system further comprises a plurality of reflecting mirrors establishing an optical path between said first and second lens means.

5. A signal play-back device according to claim 1; further comprising a common housing supporting said light source, said photo-detecting means and said optical system in fixed relation to each other, and being movable relative to said record carrier for said scanning of the record signal variations.

6. A signal play-back device according to claim 5; in which said record carrier is in the form of a disc and is rotated about a central axis perpendicular to said first and second reflective surfaces, and said common housing is movable in a direction extending radially in respect to said axis.

* * * * *